US011901112B2

(12) United States Patent
Yang et al.

(10) Patent No.: US 11,901,112 B2
(45) Date of Patent: Feb. 13, 2024

(54) COIL COMPONENT

(71) Applicant: SAMSUNG ELECTRO-MECHANICS CO., LTD., Suwon-si (KR)

(72) Inventors: Ju Hwan Yang, Suwon-si (KR); Seung Mo Lim, Suwon-si (KR); No Il Park, Suwon-si (KR); Byung Soo Kang, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 527 days.

(21) Appl. No.: 16/991,587

(22) Filed: Aug. 12, 2020

(65) Prior Publication Data

US 2021/0375529 A1 Dec. 2, 2021

(30) Foreign Application Priority Data

May 26, 2020 (KR) ........................ 10-2020-0063246

(51) Int. Cl.
*H01F 27/29* (2006.01)
*H01F 27/32* (2006.01)
(Continued)

(52) U.S. Cl.
CPC ....... *H01F 27/292* (2013.01); *H01F 17/0013* (2013.01); *H01F 17/04* (2013.01);
(Continued)

(58) Field of Classification Search
CPC .... H01F 27/292; H01F 17/0013; H01F 17/04; H01F 27/255; H01F 27/324; H01F 2017/048
See application file for complete search history.

(56) References Cited

U.S. PATENT DOCUMENTS 11,450,474 B2 9/2022 Lim et al.
2015/0048915 A1* 2/2015 Yoon .................. H01F 17/0013 336/192
(Continued)

FOREIGN PATENT DOCUMENTS

CN 111048294 A 4/2020
JP 2007-165477 A 6/2007
(Continued)

OTHER PUBLICATIONS

Korean Office Action dated Sep. 1, 2021 issued in Korean Patent Application No. 10-2020-0063246 (with English translation).
(Continued)

*Primary Examiner* — Marlon T Fletcher
*Assistant Examiner* — Malcolm Barnes
(74) *Attorney, Agent, or Firm* — Morgan, Lewis & Bockius LLP

(57) ABSTRACT

A coil component includes a support substrate, a coil portion disposed on at least one surface of the support substrate, a body including the support substrate and the coil portion disposed therein, an external electrode disposed on a surface of the body and connected to the coil portion, and an insulating layer disposed in a region of the surface of the body other than a region in which the external electrode is disposed, wherein an average roughness (Ra) of the surface of the body in contact with the external electrode is different from an average roughness (Ra) of the surface of the body in contact with the insulating layer.

22 Claims, 11 Drawing Sheets

(51) Int. Cl.
*H01F 17/00* (2006.01)
*H01F 17/04* (2006.01)
*H01F 27/25* (2006.01)
*H01F 27/255* (2006.01)

(52) U.S. Cl.
CPC ......... *H01F 27/255* (2013.01); *H01F 27/324* (2013.01); *H01F 2017/048* (2013.01)

(56) References Cited

U.S. PATENT DOCUMENTS

| | | | | |
|---|---|---|---|---|
| 2016/0035476 | A1* | 2/2016 | Mimura | H01F 41/046 336/199 |
| 2016/0126004 | A1* | 5/2016 | Yang | H01F 27/292 336/90 |
| 2016/0172103 | A1* | 6/2016 | Jeong | H01F 17/04 29/605 |
| 2017/0169930 | A1* | 6/2017 | Kudo | H01F 17/0013 |
| 2018/0182537 | A1* | 6/2018 | Shimizu | H01F 27/29 |
| 2019/0019615 | A1* | 1/2019 | Lee | H01F 27/255 |
| 2019/0066900 | A1* | 2/2019 | Nakajima | H01F 41/041 |
| 2019/0326041 | A1* | 10/2019 | Kawaguchi | H01F 1/06 |
| 2020/0118729 | A1 | 4/2020 | Lim et al. | |
| 2020/0381170 | A1 | 12/2020 | Park et al. | |
| 2021/0043367 | A1* | 2/2021 | Yoshioka | H01F 27/2828 |

FOREIGN PATENT DOCUMENTS

| | | | |
|---|---|---|---|
| JP | 2018-107346 | A | 7/2018 |
| JP | 2019-041032 | A | 3/2019 |
| KR | 10-2020-0041696 | A | 4/2020 |
| KR | 10-2020-0136188 | A | 12/2020 |

OTHER PUBLICATIONS

Office Action dated Dec. 5, 2023 issued in the corresponding Chinese Patent Application No. 202011082508.2 with English translation.

* cited by examiner

COIL COMPONENT

CROSS-REFERENCE TO RELATED APPLICATION(S)

The present application claims the benefit of priority to Korean Patent Application No. 10-2020-0063246 filed on May 26, 2020 in the Korean Intellectual Property Office, the disclosure of which is incorporated herein by reference in its entirety.

TECHNICAL FIELD

The present disclosure relates to a coil component.

BACKGROUND

An inductor, a type of coil component, is a representative passive electronic component used in electronic devices, along with a resistor and a capacitor.

As electronic devices have been designed to have high performance and reduced sizes, an increased number of coil components have been used in electronic devices and sizes of coil components have been reduced. Accordingly, a thin film inductor, which may be formed by forming a coil portion on a substrate by a plating process, burying a coil formed on the substrate using a magnetic material sheet, and forming an external electrode on an external surface of a magnetic body, has been developed.

In the process of manufacturing a general coil component, an external electrode may be formed after preferentially printing an insulating layer on a region of a surface of a body other than a region in which an external electrode is formed. In this case, an insulating layer may need to be printed on an upper surface, a side surface, and a lower surface of the body such that it may be difficult to collectively form the insulating layer on the surface of the body, which is a limitation in process. Also, in an individual printing process, the insulating layer may not be formed on an edge of the body.

Thus, it may be necessary to collectively form an insulating layer on a surface of a body by a process of preferentially disposing a sacrificial layer in a region in which an external electrode is formed.

SUMMARY

An aspect of the present disclosure is to provide a coil component in which an insulating layer may be collectively formed on a surface of a body by a process of disposing a sacrificial layer on a region of the surface of the body on which an external electrode is formed.

Another aspect of the present disclosure is to reduce the phenomenon in which an insulating layer is not formed on an edge portion of a body.

Another aspect of the present disclosure is to increase adhesive force between a body and an external electrode through a process of peeling a sacrificial layer.

According to an aspect of the present disclosure, a coil component may include a support substrate, a coil portion disposed on at least one surface of the support substrate, a body including the support substrate and the coil portion disposed therein, an external electrode disposed on a surface of the body and connected to the coil portion, and an insulating layer disposed in a region of the surface of the body other than a region in which the external electrode is disposed, wherein an average roughness (Ra) of the surface of the body in contact with the external electrode is different from an average roughness (Ra) of the surface of the body in contact with the insulating layer.

According to another aspect of the present disclosure, a coil component may include a body including a first surface and a second surface opposing each other, a third surface and a fourth surface connecting the first surface to the second surface and opposing each other, and a fifth surface and a sixth surface connecting the first surface to the second surface and opposing each other; a support substrate disposed in the body; a coil portion disposed on at least one surface of the support substrate and including first and second lead-out patterns exposed to the second and first surfaces of the body, respectively; first and second external electrodes disposed on the second and first surfaces of the body, respectively, and connected to the first and second lead-out patterns of the coil portion, respectively; and an insulating layer, formed as one integrated piece, disposed in a region of the at least one surface of the body other than a region in which the external electrode is disposed. The body may include cut-out portions on opposing edges of the sixth surface of the body adjacent to the first and second surfaces, such that each of the first and second lead-out patterns has a groove on one edge adjacent to a respective one of the opposing edges of the sixth surface.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
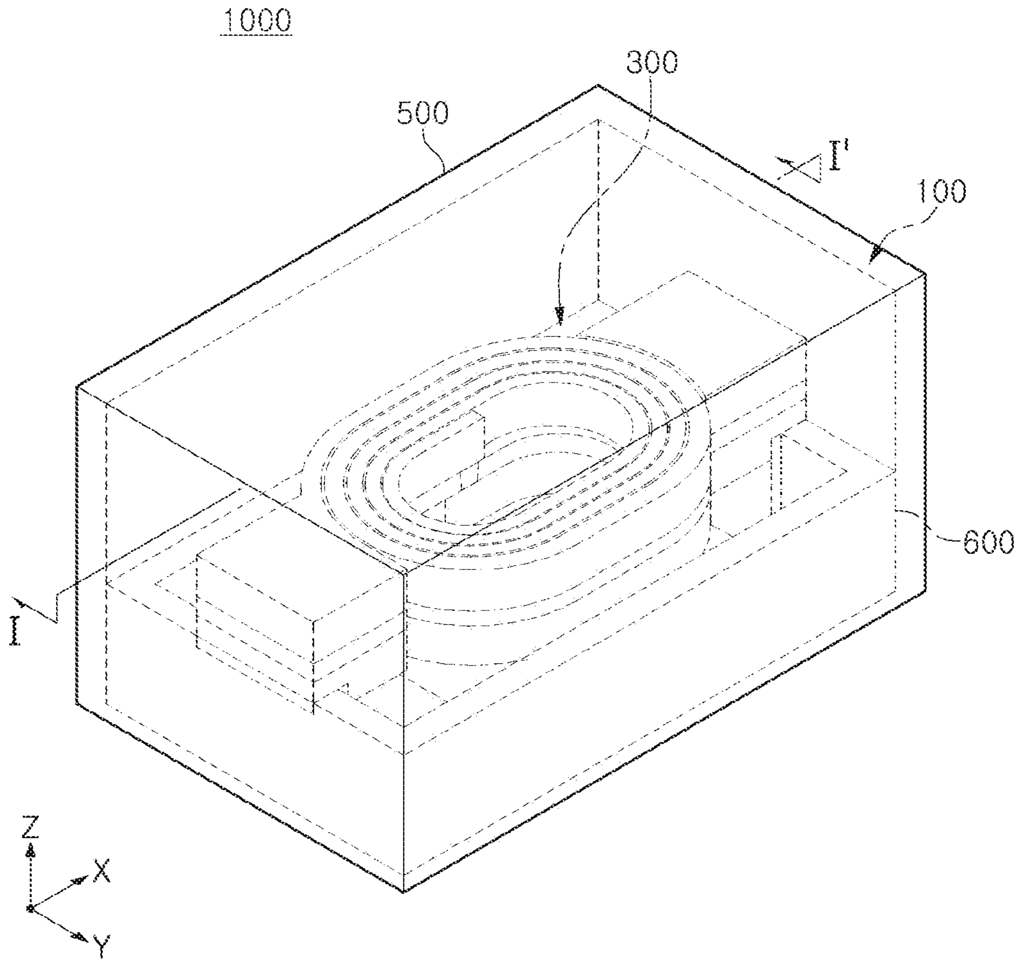
FIG. 1 is a schematic diagram illustrating a coil component according to a first example embodiment of the present disclosure.

Hereinafter, embodiments of the present disclosure will be described as follows with reference to the attached drawings.

The terms used in the following description are provided to explain a specific exemplary embodiment and are not intended to be limiting. A singular term includes a plural form unless otherwise indicated. The terms, “include,” “comprise,” “is configured to,” etc. of the description are used to indicate the presence of features, numbers, steps, operations, elements, parts or combination thereof, and do not exclude the possibilities of combination or addition of one or more features, numbers, steps, operations, elements, parts or combination thereof. Also, the terms "disposed on," "positioned on," "mounted on," and the like, may indicate that an element may be disposed on or below another element, and do not necessarily indicate that an element is only disposed in an upper portion with reference to a gravitational direction.

It will be understood that when an element is "coupled with/to" or "connected with" another element, the element may be directly coupled with/to another element, and there may be an intervening element between the element and another element.

Sizes and thicknesses of elements illustrated in the drawings are merely examples to help understanding of technical matters of the present disclosure.

In the drawings, an X direction is a first direction or a length direction, a Y direction is a second direction or a width direction, a Z direction is a third direction or a thickness direction.

In the drawings, same elements will be indicated by the same reference numerals, and overlapping descriptions will not be provided.

In electronic devices, various types of electronic components may be used, and various types of coil components may be used between the electronic components to remove noise, and other purposes.

In an electronic device, a coil component may be used as a power inductor, an HF inductor, a general bead, a GHz bead, a common mode filter, and the like.

First Example Embodiment

Figure 2:
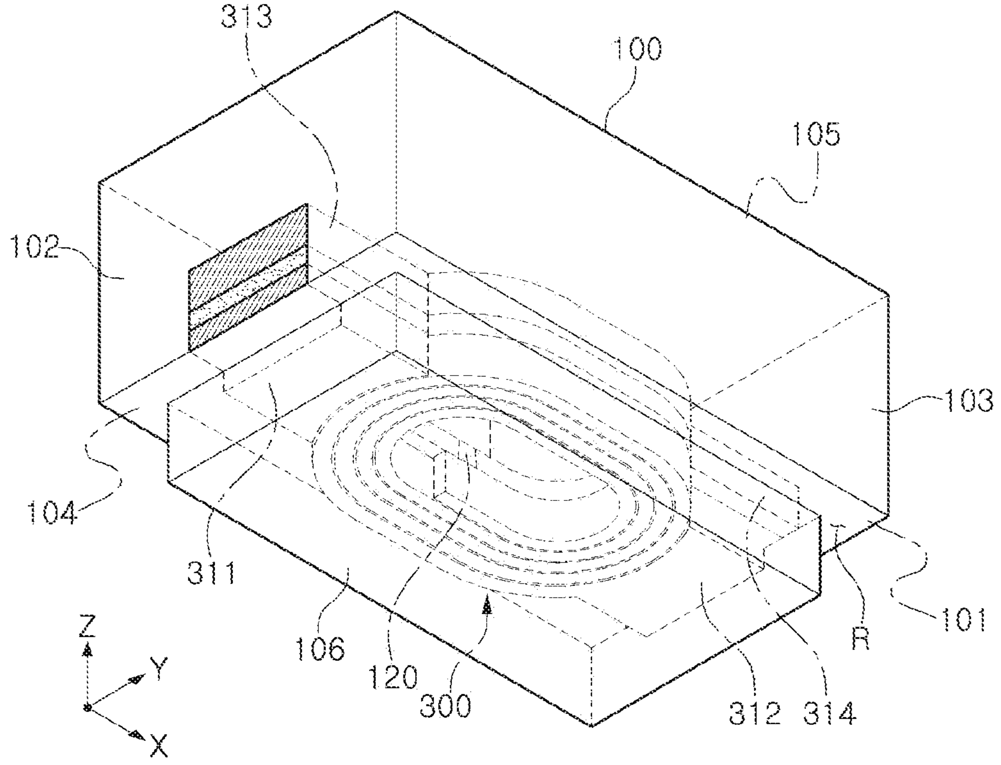
FIG. 2 is a schematic diagram illustrating the coil component illustrated in FIG. 1, viewed from below.
Figure 3:
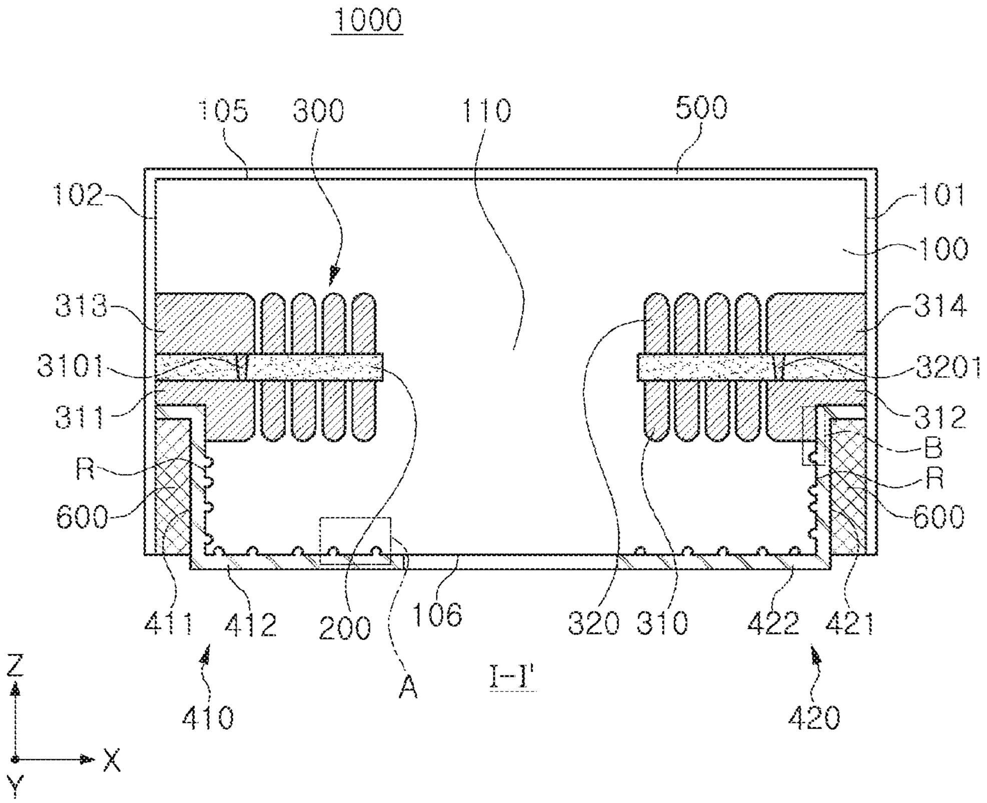
FIG. 3 is a cross-sectional diagram taken along line I-I' in FIG. 1.
Figure 4:
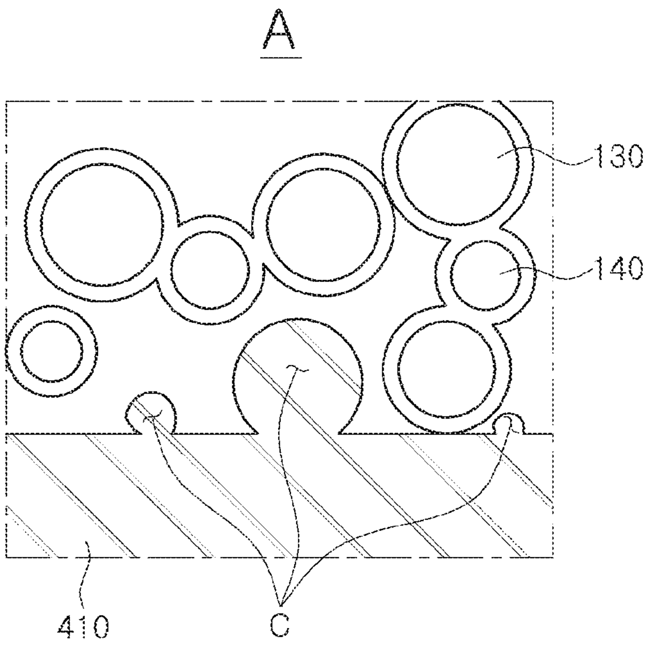
FIG. 4 is an enlarged diagram illustrating region A illustrated in FIG. 3.
Figure 5:
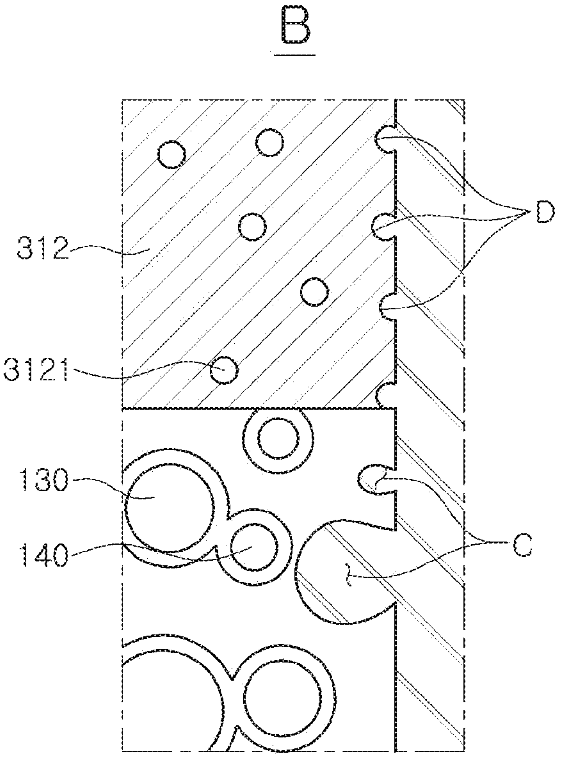
FIG. 5 is an enlarged diagram illustrating region B illustrated in FIG. 3.

FIG. 1 is a schematic diagram illustrating a coil component according to a first example embodiment. FIG. 2 is a schematic diagram illustrating the coil component illustrated in FIG. 1, viewed from below. FIG. 3 is a cross-sectional diagram taken along line I-I' in FIG. 1. FIG. 4 is an enlarged diagram illustrating region A illustrated in FIG. 3. FIG. 5 is an enlarged diagram illustrating region B illustrated in FIG. 3.

Referring to FIGS. 1 and 2, a coil component 1000 in the first example embodiment may include a body 100, a support substrate 200, a coil portion 300, external electrodes 410 and 420, and an insulating layer 500, and may further include a recess R and a filling portion 600.

The support substrate 200 may be disposed in the body 100 and may support the coil portion 300.

The support substrate 200 may be formed of a thermosetting insulating resin such as an epoxy resin, a thermoplastic insulating resin such as a polyimide resin, or an insulating material including a photosensitive insulating resin, or may be formed of an insulating material including the above-mentioned insulating materials and a reinforcement such as glass fiber or an inorganic filler. For example, the support substrate 200 may be formed of an insulating material such as prepreg, Ajinomoto build-up film (ABF), FR-4, bismaleimide triazine (BT), a photoimageable dielectric (PID), or the like, but an example of the material may not be limited thereto.

As the inorganic filler, at least one or more elements selected from among a group consisting of silica ($SiO_2$), aluminum oxide ($Al_2O_3$), silicon carbide (SiC), barium sulfate ($BaSO_4$), talc, mud, mica power, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate (BaTiO3), and calcium zirconate ($CaZrO_3$) may be used.

When the support substrate 200 is formed of an insulating material including reinforcement, the support substrate 200 may provide improved stiffness. When the support substrate 200 is formed of an insulating material which does not include a glass fiber, the support substrate 200 may be advantageous to reducing an overall thickness of the coil portion 300.

A central portion of the support substrate 200 may be penetrated and a through-hole (not illustrated) may be formed, and the through-hole (not illustrated) may be filled with a magnetic material of the body 100 such that a core portion 110 may be formed. By forming the core portion 110 filled with a magnetic material, performance of an inductor may improve.

The body 100 may form an exterior of the coil component 1000, and may include the coil portion 300 disposed therein.

The body 100 may have a hexahedral shape.

The body 100 may include a first surface 101 and a second surface 102 opposing each other in a length direction (X), a third surface 103 and a fourth surface 104 opposing each other in a width direction (Y), and a fifth surface 105 and a sixth surface 106 opposing each other in a thickness direction (Z).

The body 100 may be configured such that the coil component 1000 including the insulating layer 500 and the external electrodes 410 and 420 therein may have a length of 2.0 mm, a width of 1.2 mm, and a thickness of 0.65 mm, or a length of 1.6 mm, a width of 0.8 mm, and a thickness of 0.5 mm, but an example embodiment thereof is not limited thereto.

The length, the width, and the thickness of the coil component 1000 may be measured by a micrometer measurement method. The micrometer measurement method may measure sizes by setting a zero point using a Gage repeatability and reproducibility (R&R) micrometer (apparatus), inserting the coil component 1000 into a space between tips of the micrometer, and turning a measurement level of the micrometer. When the length of the coil component 1000 is measured by the micrometer measurement method, the length of the coil component 1000 may refer to a value measured once, or may refer to an arithmetic means of values measured multiple times. The same configuration may also be applied to the width and the thickness of the coil component 1000.

Alternatively, the length, the width, and the thickness of the coil component 1000 may be measured by a cross-section analysis. As an example, the length of the coil component 1000 obtained by the cross-section analysis may refer to, with reference to an image of a cross-sectional surface of the body 100 taken in the length direction (X)-thickness direction (Z) at a central portion of the body in the width direction (Y), obtained by an optical microscope or a scanning electron microscope (SEM), a maximum value of lengths of a plurality of segments parallel to the length direction X of the body 100 by connecting an outermost boundary line of the coil component 1000 illustrated in the cross-sectional image. Differently from the example above, the length of the coil component 1000 may refer to a minimum value of lengths of a plurality of segments parallel to the length direction X of the body 100 by connecting an outermost boundary line of the coil component 1000 illustrated in the cross-sectional image. Also, differently from the example above, the length of the coil component 1000 may refer to an average value of at least three arithmetic means of a plurality of segments parallel to the length direction X of the body 100 by connecting an outermost boundary line of the coil component 1000 illustrated in the cross-sectional image. The same description described above may also be applied to the width and the thickness of the coil component 1000.

The body 100 may include a magnetic material and resin. For example, the body 100 may be formed by layering one or more magnetic material sheets including resin and a magnetic material dispersed in resin. The body 100 may also have a structure different from the structure in which a magnetic material is disposed in resin. For example, the body 100 may be formed of a magnetic material such as ferrite.

The magnetic material may be ferrite powder or magnetic metal power.

The ferrite power may be one or more of spinel ferrite such as Mg—Zn based ferrite, Mn—Zn based ferrite, Mn—Mg based ferrite, Cu—Zn based ferrite, Mg—Mn—Sr based ferrite, Ni—Zn based ferrite, and the like, hexagonal ferrite such as Ba—Zn based ferrite, Ba—Mg based ferrite, Ba—Ni based ferrite, Ba—Co based ferrite, Ba—Ni—Co based ferrite, and the like, garnet ferrite such as Y based ferrite, and Li based ferrite, for example.

The magnetic metal power may include one or more selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal power may be at least one or more of pure iron powder, Fe—Si based alloy power, Fe—Si—Al based alloy power, Fe—Ni based alloy power, Fe—Ni—Mo based alloy power, Fe—Ni—Mo—Cu based alloy power, Fe—Co based alloy power, Fe—Ni—Co based alloy power, Fe—Cr based alloy power, Fe—Cr—Si based alloy power, Fe—Si—Cu—Nb based alloy power, Fe—Ni—Cr based alloy power, and Fe—Cr—Al based alloy power.

The magnetic metal power may be amorphous or crystalline. For example, the magnetic metal power may be Fe—Si—B—Cr based amorphous alloy power, but an example embodiment thereof is not limited thereto.

An average diameter of each of the ferrite power and the magnetic metal power may be 0.1 μm to 50 μm, but an example embodiment thereof is not limited thereto.

The body 100 may include two or more different types of magnetic materials disposed in resin. The notion that different types of magnetic materials may be included indicates that the magnetic materials may be distinguished from each other by one of an average diameter, a composition, crystallinity, and a shape. Referring to FIGS. 4 and 5, the body 100 may include a first metal magnetic powder particle 130 and a second metal magnetic powder particle 140 having a diameter smaller than a diameter of the first metal magnetic powder particle 130. In the example embodiment, the first metal magnetic powder particle 130 may be coarse powder made of a compound containing iron (Fe) and niobium (Nb), and the second metal magnetic powder particle 140 may be fine powders made of a compound containing iron (Fe). Diameters of the first and second metal magnetic powder particles 130 and 140 may be 5 μm or greater and 50 μm or less.

Resin may include one of epoxy, polyimide, liquid crystal polymer, or the like, or combinations thereof, but an example embodiment thereof is not limited thereto.

The body may include the core portion 110 penetrating the coil portion 300. The core portion 110 may be formed by filling a through-hole with a magnetic composite sheet, but an example embodiment thereof is not limited thereto.

The coil portion 300 may be disposed in the body 100 and may exhibit properties of a coil component. For example, when the coil component 1000 in the example embodiment is used as a power inductor, the coil portion 300 may maintain an output voltage by storing an electrical field as a magnetic field, thereby stabilizing power of an electronic device.

The coil portion 300 in the example embodiment may include first and second coil patterns 310 and 320, and first and second lead-out patterns 311 and 312.

The coil portion 300 may be disposed on each of one surface and the other surface of the support substrate 200 opposing each other.

Referring to FIG. 3, the coil portion 300 may include the first coil pattern 310 disposed on one surface of the support substrate 200, and the second coil pattern 320 disposed on the other surface of the support substrate 200 and spaced apart from the first coil pattern 310.

The coil portion 300 may include the first lead-out pattern 311 disposed on one surface of the support substrate 200, and the second lead-out pattern 312 disposed on one surface of the support substrate 200, spaced apart from the first lead-out pattern 311, and connected to the first coil pattern 310. Also, the coil portion 300 may include a third lead-out pattern 313 disposed on the other surface of the support substrate 200 and connected to the second coil pattern 320, and a fourth lead-out pattern 314 disposed on the other surface of the support substrate 200 and spaced apart from the third lead-out pattern 313. Referring to FIG. 3, the first lead-out pattern 311 and the second lead-out pattern 312 may be exposed to the second surface 102 and the first surface 101 of the body 100, respectively. The third lead-out pattern 313 and the fourth lead-out pattern 314 may be exposed to the second surface 102 and the first surface 101 of the body 100, respectively.

The first and second coil patterns 310 and 320 may be electrically connected to each other through a via electrode 120 penetrating the support substrate 200. Each of the first coil pattern 310 and the second coil pattern 320 may have a planar spiral shape forming at least one turn about the core portion 110 as an axis. As an example, the first coil pattern 310 may format least one turn about the core portion 110 on one surface of the support substrate 200.

In the example embodiment, the coil portion 300 may include the third lead-out pattern 313 connected to the first lead-out pattern 311 through a first connection via 3101. Also, the coil portion 300 may include the fourth lead-out pattern 314 connected to the second lead-out pattern 312 through a second connection via 3201.

Referring to FIG. 3, the first and third lead-out patterns 311 and 313 and the second and fourth lead-out patterns 312 and 314 may be disposed to oppose each other based on the support substrate 200 as a center. For example, the first lead-out pattern 311 disposed on one surface of the support substrate 200 may be disposed to oppose the third lead-out pattern 313 disposed on the other surface of the support substrate 200. The second lead-out pattern 312 disposed on one surface of the support substrate 200 may be disposed to oppose the fourth lead-out pattern 314 disposed on the other surface of the support substrate.

Referring to FIG. 3, the coil portion 300 may be connected to the first and second external electrodes 410 and 420 through the first to fourth lead-out patterns 311, 312, 313, and 314 disposed in the body 100. The first to fourth lead-out patterns 311, 312, 313, and 314 may be electrically connected to the first and second connection vias 3101 and 3201 and may work as input terminals or output terminals of the coil component 1000.

At least one of the coil portion 300 and a via electrode 120 may include at least one or more conductive layers.

As an example, when the first coil pattern 310, the first lead-out pattern 311, and the via electrode 120 are formed on one surface of the support substrate 200 by a plating process, each of the first coil pattern 310, the first lead-out pattern 311, and the via electrode 120 may include a seed layer, an electroless plating layer, and an electrolytic plating layer. The electrolytic plating layer may have a single layer structure or a multilayer structure. The electrolytic plating layer having a multilayer structure may be formed in a conformal film structure in which an electrolytic plating layer is covered by another electrolytic plating layer, or a structure in which an electrolytic plating layer is only layered on one surface of one of the electrolytic plating layers. The seed layer of the first coil pattern 310, the seed layer of the first lead-out pattern 311, and the seed layer of the via electrode 120 may be integrated with each other such that a boundary may not be formed therebetween, but an example embodiment thereof is not limited thereto. The electrolytic plating layer of the first coil pattern 310, the electrolytic plating layer of the first lead-out pattern 311, and the electrolytic plating layer of the via electrode 120 may be integrated with each other such that a boundary may not be formed therebetween, but an example embodiment thereof is not limited thereto.

The coil portion 300 may be formed of a conductive material such as copper (Cu), aluminum (Al), silver (Ag), tin (Sn), gold (Au), nickel (Ni), lead (Pb), titanium (Ti), or alloys thereof, but an example of the material is not limited thereto.

The first and second external electrodes 410 and 420 may be connected to the first lead-out pattern 311 and the second lead-out pattern 312, respectively. The first and second external electrodes 410 and 420 may be disposed on the second surface 102 and the first surface 101 of the body 100, respectively, and may extend to the sixth surface 106 of the body 100 to be spaced apart from each other. Referring to FIG. 3, the first and second external electrodes 410 and 420 may include first and second connection portions 411 and 421 disposed on the recess R and connected to the first and second lead-out patterns 311 and 312, respectively, and first and second extension portions 412 and 422 extending to the first and second connection portions 411 and 421 and disposed on the sixth surface 106 of the body 100. The first external electrode 410 and the second external electrode 420 may be electrically connected to each other by the coil portion 300, and may be spaced apart from each other on a surface of the body 100 and the recess R.

For example, the first external electrode 410 may include the first connection portion 411 disposed in a region of an internal surface of a recess R in which the first lead-out pattern 311 is exposed, and in contact with and connected to the first lead-out pattern 311, and the first extension portion 412 extending from the first connection portion 411 to the sixth surface 106 of the body 100. The second external electrode 420 may include the second connection portion 421 disposed in a region of an internal surface of the recess R in which the second lead-out pattern 312 is exposed, and in contact with and connected to the second lead-out pattern 312, and the second extension portion 422 extending from the second connection portion 421 to the sixth surface 106 of the body 100. The first and second external electrodes 410 and 420 may form along the internal surface of the recess R and the sixth surface 106 of the body 100. Accordingly, each of the first and second external electrodes 410 and 420 may be formed in a form of a conformal film.

The first and second extension portions 412 and 422 may be integrated with each other on the sixth surface 106 of the body 100. Accordingly, the first connection portion 411 and the first connection portion 412 of the first external electrode 410 may formed together in the same process and may be integrated with other, and the second connection portion 421 and the first extension portion 412 of the second external electrode 420 may be formed together in the same process and may be integrated with each other. The first and second external electrodes 410 and 420 may be formed by a thin film process such as a sputtering process.

The first and second external electrodes 410 and 420 may be formed of a conductive material such as copper (Cu), aluminum (Al), silver (Ag), tin (Sn), gold (Au), nickel (Ni), lead (Pb), chromium (Cr), titanium (Ti), or alloys thereof, but an example of the material is not limited thereto. Although not illustrated in detail in the diagram, each of the first and second external electrodes 410 and 420 may be configured as a single layer or may include a plurality of layers. As an example, the first external electrode 410 may include a first layer including copper (Cu), a second layer disposed on the first layer and including nickel (Ni), and a third layer disposed on the second layer and including tin (Sn).

The insulating layer 500 may be disposed in a region of the surface of the body 100 other than a region in which the external electrodes 410 and 420 are disposed.

In the process of manufacturing a general coil component, the external electrodes 410 and 420 may be formed after preferentially forming the insulating layer 500 on a region of the surface of the body 100 other than a region in which the external electrodes 410 and 420 are disposed. In this case, as the insulating layer 500 needs to be printed on each of an upper surface, a side surface, and a lower surface of the body 100, it may be difficult to collectively form the insulating layer 500 on the surface of the body 100, which may be a limitation process. Also, in an individual printing process, the insulating layer may not be formed on an edge of the body. Such an issue may lead to a plating defect on the edge portion of the body 100 on which current density of a component is concentrated. In the example embodiment, the insulating layer 500 may be collectively formed on the surface of the body 100 through a series of processes of preferentially disposing a sacrificial layer (not illustrated) in a region in which the external electrodes 410 and 420 are formed.

In a coil bar state in which pre-dicing is completed, a sacrificial layer (not illustrated) may be formed to correspond to a region of a surface of the body 100 in which the external electrodes 410 and 420 are formed. The sacrificial layer (not illustrated) may protect the surface of the body 100 to prevent the insulating layer 500 from being formed on the region in which the external electrodes 410 and 420 are formed. As an example, the sacrificial layer (not illustrated) may be formed with an inkjet pattern, but an example embodiment thereof is not limited thereto. As an example, the sacrificial layer (not illustrated) may include a monomer which has adhesiveness and is not cured to temporarily protect the surface of the body 100.

After the sacrificial layer (not illustrated) is formed, an entire surface of the body 100 may be insulated by vertical spray coating. As an example, the second surface 102 to the sixth surfaces 106 of the body 100 other than the first surface 101 may be insulated through a first vertical spray coating process. The first surface 101 and the third 103 to the sixth surface 106 of the body 100 other than the second surface 102 may be insulated through a second vertical spray coating process. Accordingly, the entire surface of the surface of the body 100 including the region in which the sacrificial layer (not illustrated) is formed may be collectively insulated. When the insulating layer 500 is formed on the sixth surface 106 of the body 100, the first and second extension portions 412 and 422 of the first and second external electrodes 410 and 420 may extend from the first and second connection portions 411 and 421 to a lower surface of the insulating layer 500. The insulating layer 500 may include a thermoplastic resin such as polystyrene resin, vinyl acetate resin, polyester resin, polyethylene resin, polypropylene resin, polyamide resin, rubber resin, acrylic resin, or the like, a thermosetting resin such as phenol resin, epoxy resin, urethane resin, melamine resin, alkyd resin, a photosensitive resin, parylene, SiOx, or SiNx.

Thereafter, by selectively removing only the region in which the sacrificial layer (not illustrated) is formed, the insulating layer 500 may remain on the surface of the body 100 other than the region in which the external electrodes 410 and 420 are formed. A method of removing the sacrificial layer (not illustrated) is not limited to any particular method, but a chemical or physical method may be used. As an example, as a chemical method, a method of submerging the sacrificial layer (not illustrated) in an alcohol based chemicals may be used, and as a physical method, a method of removing the sacrificial layer (not illustrated) by applying vibrations to an entire component may be used.

When the chemical removing method and the physical removing methods are applied simultaneously, the sacrificial layer (not illustrated) and also a metal magnetic powder particle on the surface of the body 100 may also be removed. As the sacrificial layer (not illustrated) may be formed in a region in which the external electrodes 410 and 420 are formed, the removing of the metal magnetic powder particles 130 and 140 may only be performed on the surface of the body 100 in contact with the external electrodes 410 and 420. Accordingly, referring to FIG. 3, an average roughness (Ra) of the surface of the body 100 in contact with the external electrodes 410 and 420 may be different from an average roughness (Ra) of the surface of the body 100 in contact with the insulating layer 500. Also, in the example embodiment, an average roughness (Ra) of the surface of the body 100 in contact with the external electrodes 410 and 420 may be greater than an average roughness (Ra) of the surface of the body 100 in contact with the insulating layer 500. Referring to FIG. 4, the first metal magnetic powder particle 130 or the second metal magnetic powder particle 140 of the body 100 may be removed from the surface of the body 100 such that a groove portion C having a size corresponding to a grain size of the first metal magnetic powder particle 130 or the second metal magnetic powder particle 140 may be formed. The groove portion C may have a shape recessed into the body 100, and may be formed discontinuously on the surface of the body 100. Referring to FIG. 4, the groove portion C may be filled with the first external electrode 410. Although not illustrated in detail in the diagram, the groove portion C may be filled with the second external electrode 420. As the groove portion C corresponds to grain sizes of the first and second metal magnetic powder particles 130 and 140, an average roughness (Ra) of the surface of the body 100 in contact with the external electrodes 410 and 420 may be 5 μm or greater and 50 μm or less. Accordingly, as the groove portion C corresponds to grain sizes of the first and second metal magnetic powder particles 130 and 140, a contact area between the body 100 and the external electrodes 410 and 420 may increase. Accordingly, the number of metal combinations formed by metal atoms of each of the body 100 and the external electrodes 410 and 420 may increase such that adhesive force between the body 100 and the external electrodes 410 and 420 may improve. When an average roughness (Ra) of the surface of the body 100 in contact with the external electrodes 410 and 420 is less than 5 μm, an effect of improvement in adhesive force between the body 100 and the external electrodes 410 and 420 may be insignificant. When an average roughness (Ra) of the surface of the body 100 exceeds 50 μm, an area of the entire component occupied by the body 100 may decrease such that inductance properties may be deteriorated. Also, as described above, as the effect of improvement in adhesive force between the body 100 and the external electrodes 410 and 420 may occur according to grain sizes of the first and second metal magnetic powder particles 130 and 140, when an average roughness (Ra) of the surface of the body 100 in contact with the external electrodes 410 and 420 is less than 5 μm or exceeds 50 μm, the effect of improvement in adhesive force between the body 100 and the external electrodes 410 and 420 may rarely occur.

After the dicing for exposing the coil portion 300 to the first and second surfaces 101 and 102 of the body 100, copper (Cu) particles of the coil portion 300 may be oxidized in the air such that an oxide film (not illustrated) may be formed. In the example embodiment, by additionally performing a process of removing the oxide film (not illustrated), the oxide film (not illustrated) formed in the coil portion 300 may be removed. Referring to FIG. 5, a groove portion D may be formed in the second lead-out pattern 312 as copper (Cu) particles 3121 of the second lead-out pattern 312 may also be removed when the oxide film (not illustrated) is removed. Although not illustrated in detail, the groove portion D may be formed in the first lead-out pattern 311 as copper (Cu) particles of the first lead-out pattern 311 may also be removed when the oxide film (not illustrated) is removed. Sizes of the copper (Cu) particles 3121 included in the first and second lead-out patterns 311 and 312 may be less than sizes of the first and second metal magnetic powder particles 130 and 140. As a size of the groove portion D of the first and second lead-out patterns 311 and 312 correspond to a size of the copper (Cu) particle, an average roughness (Ra) of the first and second lead-out patterns 311 and 312 in contact with the first and second external electrodes 410 and 420 may be less than an average roughness (Ra) of the surface of the body 100 in contact with the first and second external electrodes 410 and 420. Although not illustrated in detail, in the example embodiment, an average roughness (Ra) of the first and second lead-out patterns 311 and 312 in contact with the first and second external electrodes 410 and 420 may be 1 μm or less. As an average roughness (Ra) corresponds to a grain size of the copper (Cu) particle, an area of contact between the coil portion 300 and the external electrodes 410 and 420 may increase. Accordingly, the number of atoms forming a metal combination between the coil portion 300 and the external electrodes 410 and 420 increases, adhesive force between the coil portion 300 and the external electrodes 410 and 420 may improve. When an average roughness (Ra) of the first and second lead-out patterns 311 and 312 in contact with the first and second external electrodes 410 and 420 exceeds 1 μm, the effect of removing the oxide film (not illustrated) described above may not properly occur. When the oxide film (not illustrated) is not properly removed, a copper oxide such as CuOx, etc. may remain on the surface of the coil portion 300. Accordingly, the effect of improvement in adhesive force between the coil portion 300 and the external electrodes 400 may degrade. As loss of copper (Cu) particles on the first and second lead-out patterns 311 and 312 increases, contact resistance may increase.

In the example embodiment, an average roughness (Ra) may refer to an average value of roughness measured from a surface of the body 100 or surfaces of the first and second lead-out patterns 311 and 312. An average roughness (Ra) of a surface of the body 100 may be calculated by measuring a depth of a plurality of the groove portions C formed on the surface of the body 100 and calculating an arithmetic mean value of the measured values. An average roughness (Ra) of surfaces of the first and second lead-out patterns 311 and 312 may be calculated by measuring a depth of a plurality of the groove portionsD formed on surfaces of the first and second lead-out patterns 311 and 312 and calculating an arithmetic mean value of the measured values. As an example, the average roughness (Ra) may be measured using a micro profiler, a 3D measuring device which may measure roughness and a shape of a surface.

A recess R may be formed to surround the first to fourth surfaces 101, 102, 103, and 104 of the body 100 on the sixth surface 106 of the body 100. Accordingly, the recess R may be formed along an entire edge region formed by each of the first to fourth surfaces 101, 102, 103, and 104 of the body 100 and the sixth surface 106 of the body 100. The recess R may not extend to the fifth surface 105 of the body 100. Accordingly, the recess R may not penetrate the body 100 in a thickness direction Z of the body 100.

The recess R may be formed by performing pre-dicing on a boundary line (a dicing line or a singulation line) between the bodies 100 on one surface side of a coil bar. A width of a pre-dicing tip used for the pre-dicing may be wider than a width of a dicing line of the coil bar. The coil bar may refer to a state in which the plurality of bodies 100 are connected to each other in a length direction and a width direction of the body 100. Also, a width of a dicing line may refer to a width of a full-dicing tip of full-dicing for individualizing the coil bar.

A depth of the pre-dicing may be adjusted such that a portion of each of the first and second lead-out patterns 311 and 312 may be removed along with a portion of the body 100. Accordingly, the depth may be adjusted such that the first and second lead-out patterns 311 and 312 are exposed to an internal surface of the recess R. However, a depth of the pre-dicing may be adjusted to not penetrate one surface and the other surface of the coil bar. Accordingly, the coil bar may be maintained in a state in which the plurality of bodies are connected to each other even after the pre-dicing.

An internal wall of the recess R and a bottom surface of the recess R, internal surfaces of the recess R, may also form a surface of the body 100. However, in the example embodiment, the internal wall of the recess R and the bottom surface of the recess R may be distinguished from the surface of the body 100.

The first and second lead-out patterns 311 and 312 may be exposed to the internal surfaces of the recess R. A portion of the body 100 and also a portion of each of the first and second lead-out patterns 311 and 312 may be removed in the process of forming the recess. Accordingly, the recess Rmay extend to each of the first and second lead-out patterns 311 and 312. Accordingly, the first and second external electrodes 410 and 420 may be formed on the first and second lead-out patterns 311 and 312 exposed to the internal surface of the recess R such that the coil portion 300 may be connected to the first and second external electrodes 410 and 420.

FIG. 3 illustrates the example in which the recess R is formed to partially penetrate a lower portion of each of the first and second lead-out patterns 311 and 312 such that the first and second lead-out patterns 311 and 312 may be exposed to the internal wall and the bottom surface of the recess R, but an example embodiment thereof is not limited thereto. In other words, as another example embodiment, although not limited thereto, by adjusting a depth of the pre-dicing, the recess R may be formed such that the first and second lead-out patterns 311 and 312 may be exposed to the internal wall of the recess R and may penetrate upper and lower portions of the first and second lead-out patterns 311 and 312, respectively. Alternatively, the recess R may be formed to have a depth by which the recess R may penetrate the first lead-out pattern 311 and may not penetrate the second lead-out pattern 312. In this case, the first lead-out pattern 311 may be exposed to the internal wall of the recess R, and the second lead-out pattern 312 may be exposed to both the bottom surface and the internal wall of the recess R. Also, as an example, although not limited thereto, a depth of the recess R formed on the first surface 101 side of the body 100 may be different from a depth of the recess R formed on the second surface 102 side of the body 100.

One surfaces of the first and second lead-out patterns 311 and 312 exposed to the internal surface of the recess R may have surface roughness higher than that of the other surfaces of the first and second lead-out patterns 311 and 312. As an example, when the first and second lead-out patterns 311 and 312 are formed by a plating process, and the recess R is formed by the pre-dicing, a portion of each of the first and second lead-out patterns 311 and 312 may be removed by a pre-dicing tip. Accordingly, one surfaces of the first and second lead-out patterns 311 and 312 exposed to the internal surface of the recess R may have surface roughness higher than that of the other surfaces of the first and second lead-out patterns 311 and 312 due to grinding by the pre-dicing tip. The first and second external electrodes 410 and 420 may be formed as thin films such that adhesive force with the body 100 may be week. However, as the first and second external electrodes 410 and 420 are in contact with and connected to the one surfaces of the first and second lead-out patterns 311 and 312 having relatively higher roughness, adhesive force between the first and second external electrodes 410 and 420 and the first and second lead-out patterns 311 and 312 may improve.

The filling portion 600 may fill the recess R and may cover the connection portions 411 and 421. Accordingly, in the example embodiment, the connection portions 411 and 421 of the first and second external electrodes 410 and 420 may be disposed between the filling portion 600 and the internal surface of the recess R.

One surface of the filling portion 600 may be disposed on a plane substantially the same as the first and second surfaces 101 and 102 of the body 100 and the third and fourth surfaces 103 and 104 of the body 100. As an example, the first and second external electrodes 610 and 620 may be formed in a coil bar state, a space between the connection portions 411 and 421 of an adjacent body 100 may be filled with a material for forming a filling portion, and the full-dicing may be performed such that one surface of the filling portion 600 may be disposed on a plane substantially the same as the first to fourth surfaces 101, 102, 103, and 104 of the body 100.

The filling portion 600 may include an insulating resin. An insulating resin may include one of epoxy, polyimide, liquid crystal polymer, or the like, or combinations thereof, but an example embodiment thereof is not limited thereto.

The filling portion 600 may further include magnetic powder dispersed in an insulating resin. The magnetic powder may be ferrite or metal magnetic powder.

The ferrite power may be one or more of spinel ferrite such as Mg—Zn based ferrite, Mn—Zn based ferrite, Mn—Mg based ferrite, Cu—Zn based ferrite, Mg—Mn—Sr based ferrite, Ni—Zn based ferrite, and the like, hexagonal ferrite such as Ba—Zn based ferrite, Ba—Mg based ferrite, Ba—Ni based ferrite, Ba—Co based ferrite, Ba—Ni—Co based ferrite, and the like, garnet ferrite such as Y based ferrite, and Li based ferrite, for example.

The magnetic metal power may include one or more selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal power may be at least one or more of pure iron powder, Fe—Si based alloy power, Fe—Si—Al based alloy power, Fe—Ni based alloy power, Fe—Ni—Mo based alloy power, Fe—Ni—Mo—Cu based alloy power, Fe—Co based alloy power, Fe—Ni—Co based alloy power, Fe—Cr based alloy power, Fe—Cr—Si based alloy power, Fe—Si—Cu—Nb based alloy power, Fe—Ni—Cr based alloy power, and Fe—Cr—Al based alloy power.

The magnetic metal power may be amorphous or crystalline. For example, the magnetic metal power may be Fe—Si—B—Cr based amorphous alloy power, but an example embodiment thereof is not limited thereto.

An average diameter of each of ferrit and the magnetic metal power may be 0.1 μm to 30 μm, but an example embodiment thereof is not limited thereto.

Second Example Embodiment

Figure 6:
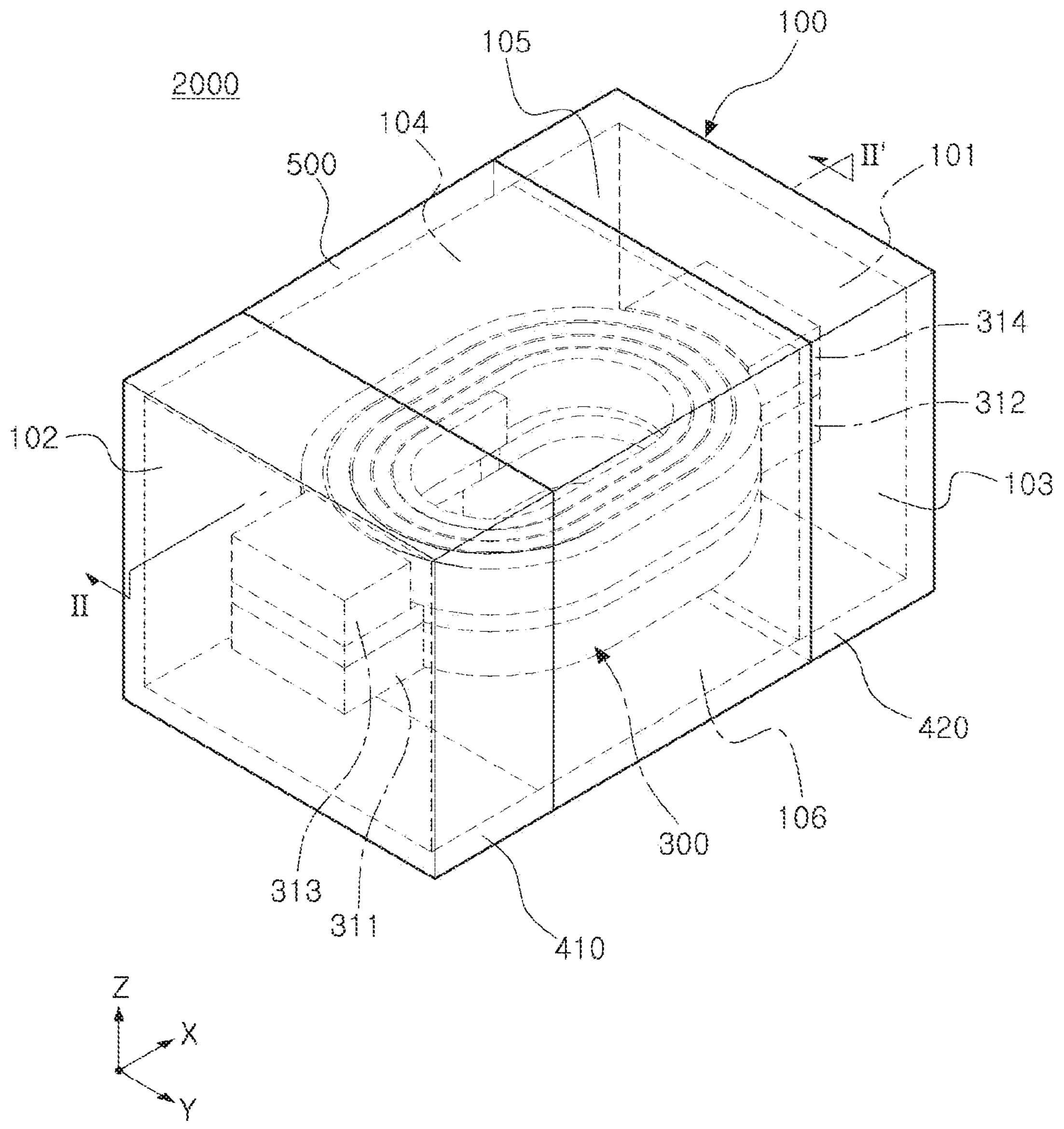
FIG. 6 is a schematic diagram illustrating a coil component according to a second example embodiment.
Figure 7:
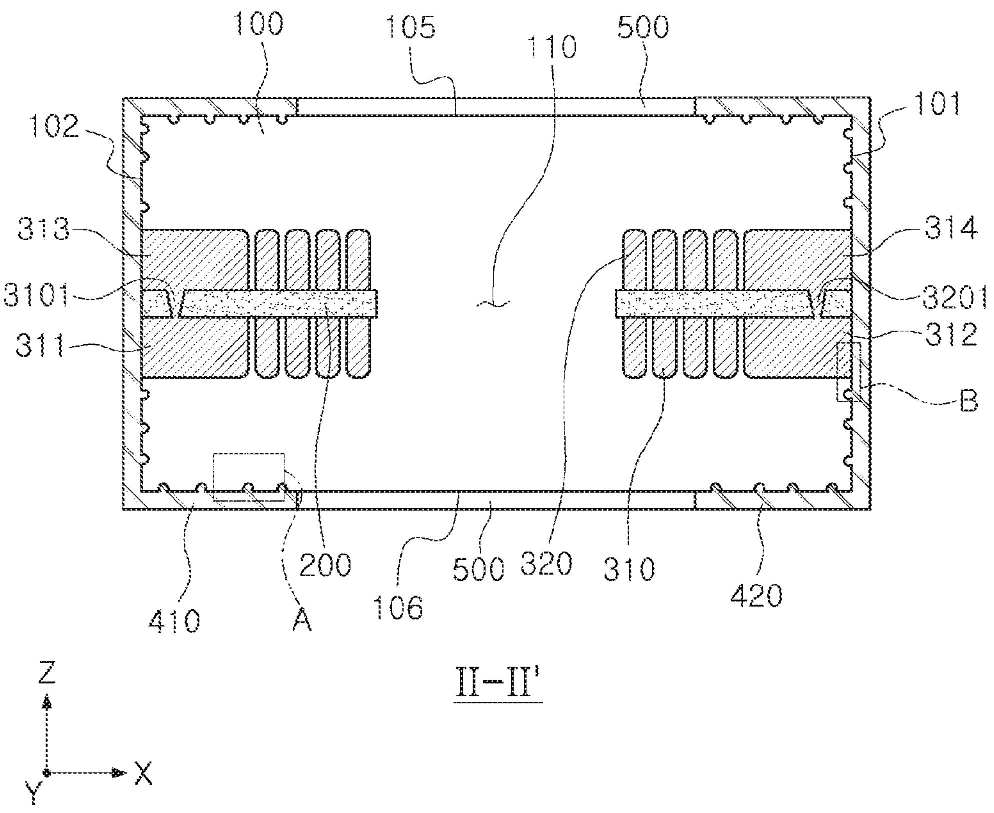
FIG. 7 is a cross-sectional diagram taken along line II-II' in FIG. 6.

FIG. 6 is a schematic diagram illustrating a coil component according to a second example embodiment. FIG. 7 is a cross-sectional diagram taken along line II-II' in FIG. 6.

A coil component 2000 in the example embodiment may not include the recess R and the filling portion 600 as compared to the coil component 2000 in the first example embodiment, and a method of forming the sacrificial layer (not illustrated) and shapes of the first and second external electrodes 410 and 420 may be different from those of the first example embodiment. In the description of the example embodiment, only the recess R, the filling portion 600, the method of forming the sacrificial layer (not illustrated) and the shapes of the first and second external electrodes 410 and 420 will be described. The descriptions of the first example embodiment may also be applied to the other elements of the example embodiment.

Referring to FIGS. 6 and 7, the recess R and the filling portion 600 may not be included. In the example embodiment, as the process for forming the sacrificial layer (not illustrated) in a coil bar state in which the pre-dicing is completed is not performed, the recess R and the filling portion 600 may not be included.

In the example embodiment, the sacrificial layer (not illustrated) may be configured to enclose the first surface 101 and the second surface 102 of the body 100 by a liquid dipping method. Accordingly, the sacrificial layer (not illustrated) may be formed in a region other than a region of the body 100 in which the external electrodes 410 and 420 are formed. After the sacrificial layer (not illustrated) is formed, an entire surface of the body 100 may be insulated including the region in which the sacrificial layer (not illustrated) is formed by vertical spray coating. Thereafter, only the region in which the sacrificial layer (not illustrated) is formed may be selectively removed such that the insulating layer 500 may only remain on a portion of each of the fifth surface 105 and the sixth surface 106 of the body 100.

Referring to FIG. 7, each of the first and second external electrodes 410 and 420 may extent further to the fifth surface 105 of the body 100. Accordingly, the first and second external electrodes 410 and 420 may be formed on portions of the fifth surface 105 and the sixth surface 106 of the body 100 in which the insulating layer 500 does not remain, respectively. For example, the first external electrode 410 may be formed on the second surface 102 of the body 100 and may extend to portions of the fifth surface 105 and the sixth surface 106 of the body 100, and the second external electrode 420 may be formed on the first surface 101 of the body 100 and may extend to a portion of the fifth surface 105 and the sixth surface 106 of the body 100.

Third Example Embodiment

Figure 8:
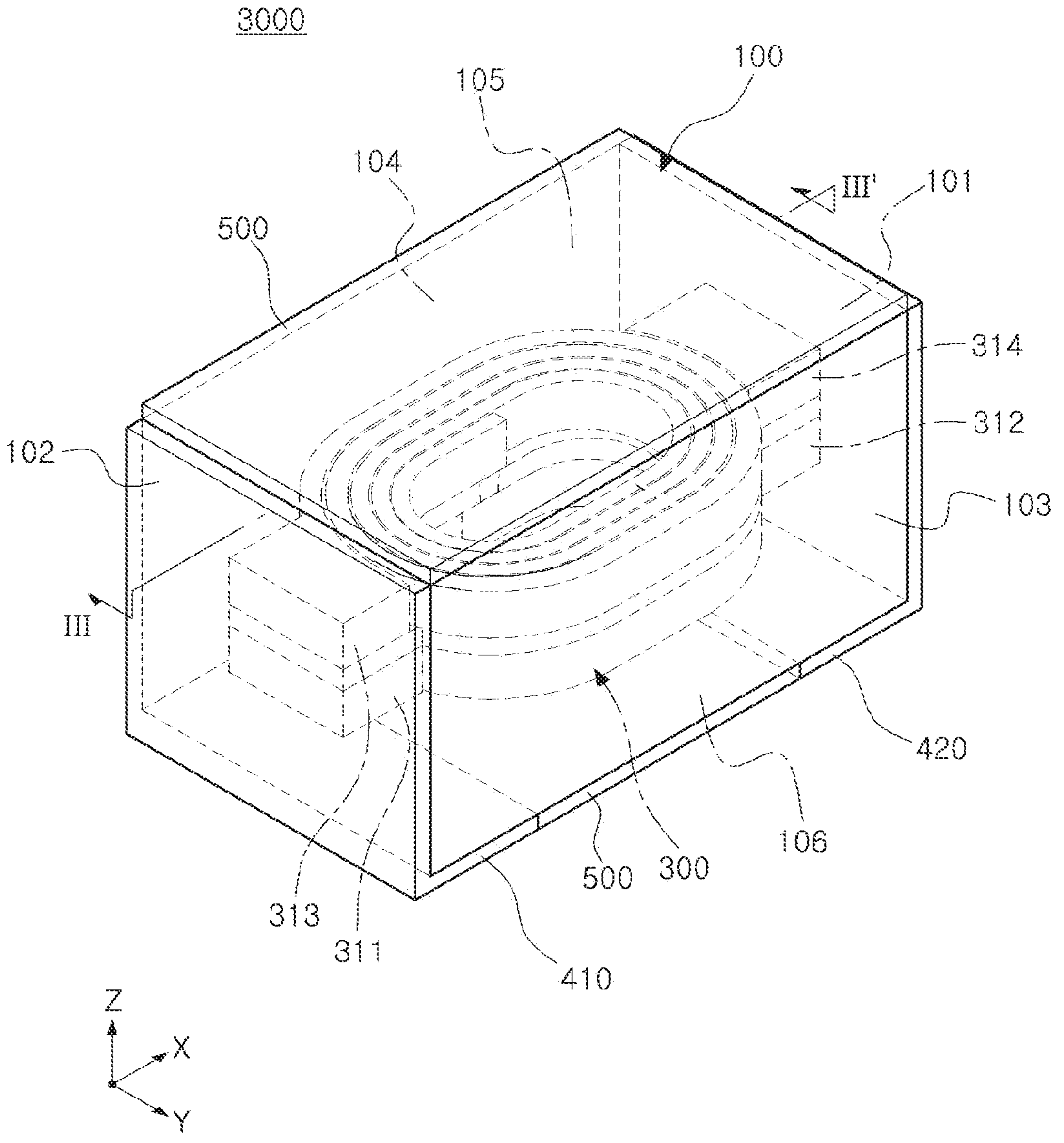
FIG. 8 is a schematic diagram illustrating a coil component according to a third example embodiment.
Figure 9:
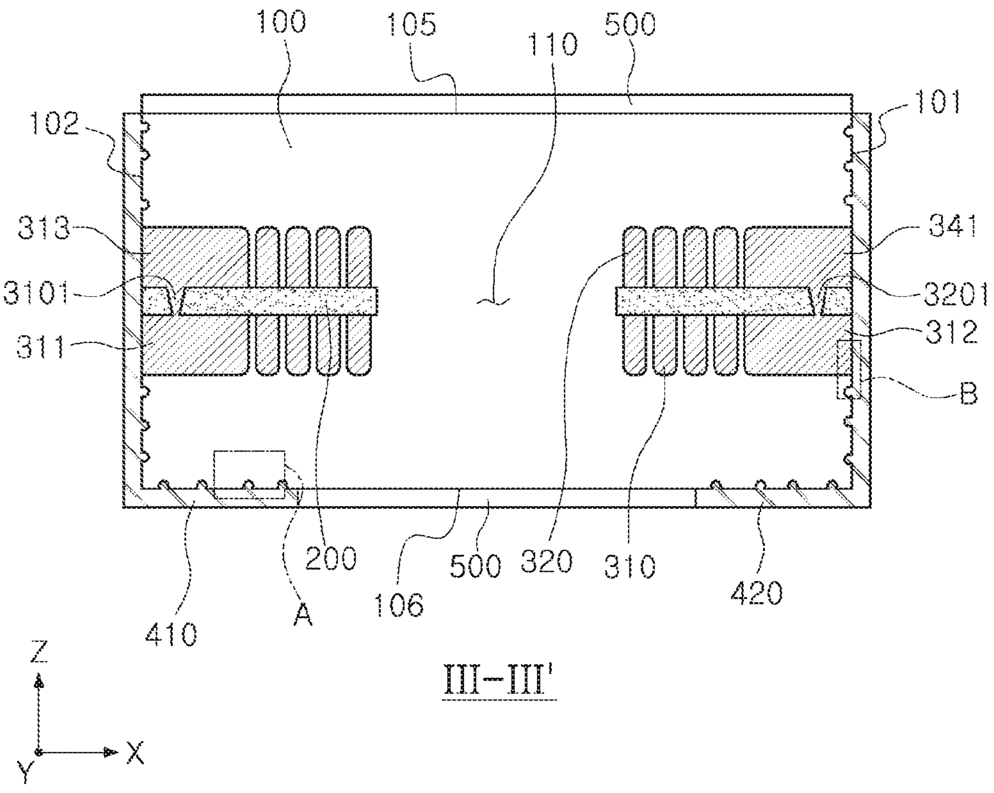
FIG. 9 is a cross-sectional diagram taken along line III-III' in FIG. 8.

FIG. 8 is a schematic diagram illustrating a coil component according to a third example embodiment. FIG. 9 is a cross-sectional diagram taken along line III-III' in FIG. 6.

A coil component 3000 in the example embodiment may not include the recess R and the filling portion 600 as compared to the coil component 3000 in the first example embodiment, and a method of forming the sacrificial layer (not illustrated) and shapes of the first and second external electrodes 410 and 420 may be different from those of the first example embodiment. In the description of the example embodiment, only the recess R, the filling portion 600, the method of forming the sacrificial layer (not illustrated) and the shapes of the first and second external electrodes 410 and 420 will be described. The descriptions of the first example embodiment may also be applied to the other elements of the example embodiment.

Referring to FIGS. 8 and 9, the recess R and the filling portion 600 may not be included. In the example embodiment, as the process for forming the sacrificial layer (not illustrated) in a coil bar state in which the pre-dicing is completed is not performed, the recess R and the filling portion 600 may not be included.

In the example embodiment, the sacrificial layer (not illustrated) may be formed by printing in a strip shape on a substrate in a coil state before being diced into individual chip components. Accordingly, the sacrificial layer (not illustrated) may be formed only on one surface of the body 100, the sixth surface 106. After the sacrificial layer (not illustrated) is formed, the sacrificial layer (not illustrated) may be coated on the first surface 101 and the second surface 102 by stamping. A width of the stamped sacrificial layer (not illustrated) may be the same as a width of the body 100. In other words, an entire surface of the body 100 including the region in which the sacrificial layer (not illustrated) is formed may be insulated.

Referring to FIG. 9, the first and second external electrodes 410 and 420 may be disposed on the entire surfaces of the second surface 102 and the first surface 101 of the body 100 and a portion of the sixth surface 106. For example, the first external electrode 410 may be formed on the second surface 102 of the body 100 and may extend to a portion of the sixth surface 106 of the body 100, and the second external electrode 420 may be formed on the first surface 101 of the body 100 and may extend to a portion of the sixth surface 106 of the body 100. Accordingly, a width of each of the first and second external electrodes 410 and 420 may be substantially the same as a width of the body.

Fourth Example Embodiment

Figure 10:
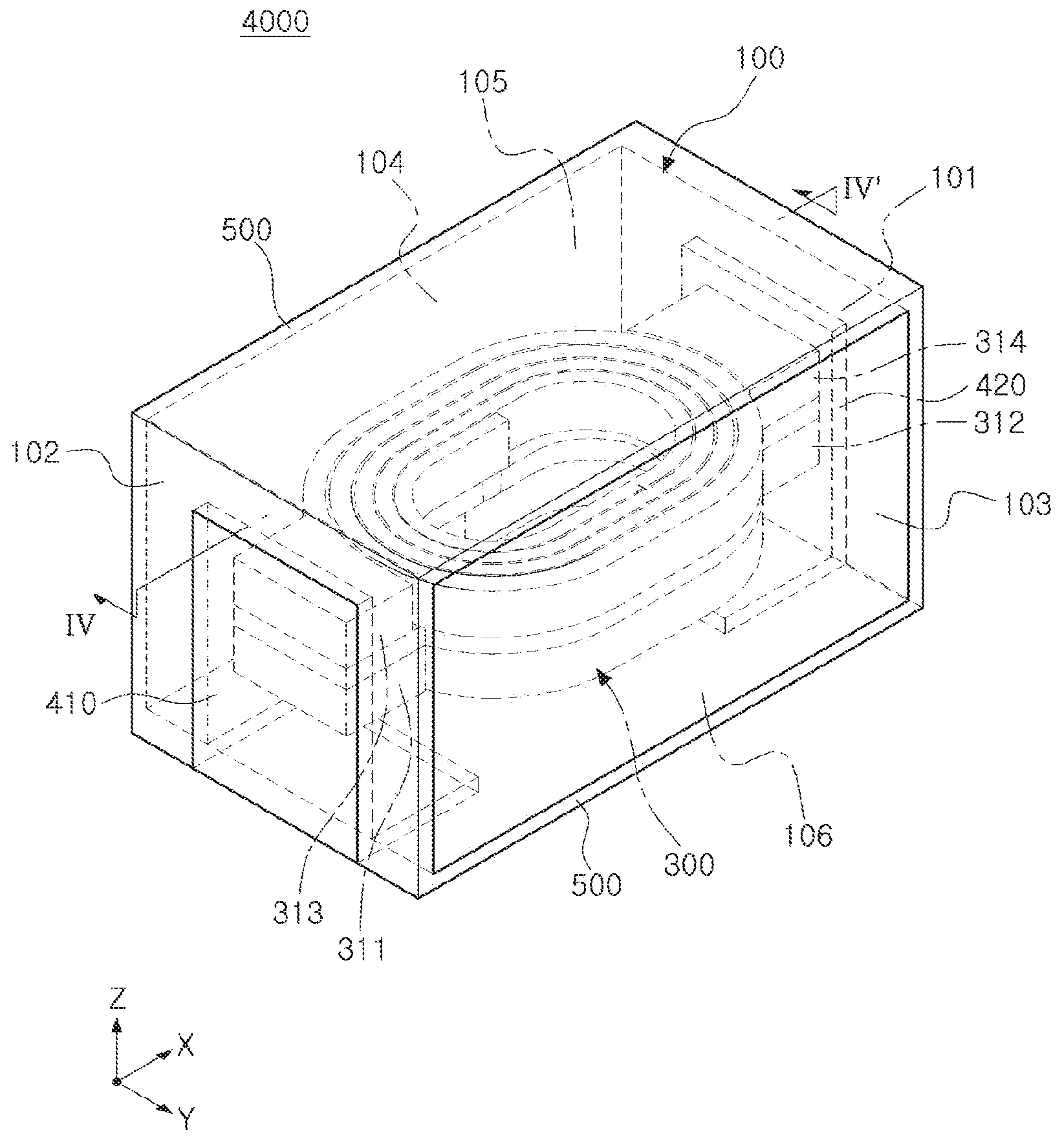
FIG. 10 is a schematic diagram illustrating a coil component according to a fourth example embodiment.
Figure 11:
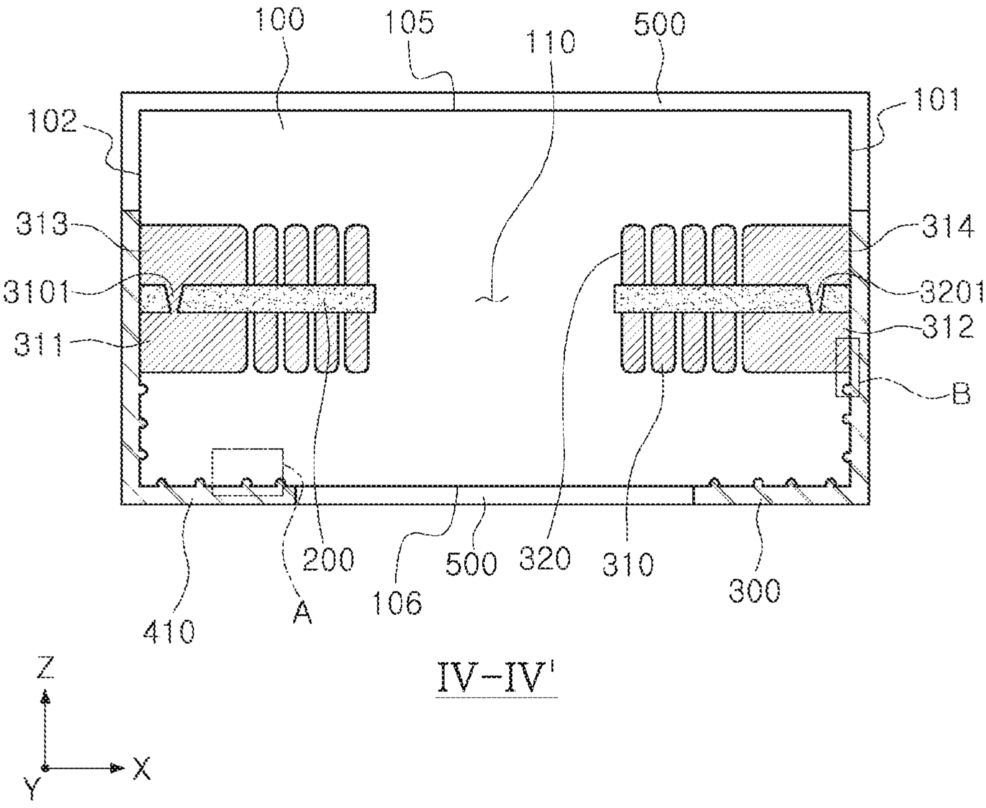
FIG. 11 is a cross-sectional diagram taken along line IV-IV' in FIG. 10.

FIG. 10 is a schematic diagram illustrating a coil component according to a fourth example embodiment. FIG. 11 is a cross-sectional diagram taken along line IV-IV' in FIG. 10.

A coil component 400 in the example embodiment may not include the recess R and the filling portion 600 as compared to the coil component 3000 in the first example embodiment, and a method of forming the sacrificial layer (not illustrated) and shapes of the first and second external electrodes 410 and 420 may be different from those of the first example embodiment. In the description of the example embodiment, only the recess R, the filling portion 600, the method of forming the sacrificial layer (not illustrated) and the shapes of the first and second external electrodes 410 and 420 will be described. The descriptions of the first example embodiment may also be applied to the other elements of the example embodiment.

In the example embodiment, a width of each of the first and second external electrodes 410 and 420 may be less than a width of the body 100.

Referring to FIGS. 10 and 11, the recess R and the filling portion 600 may not be included. In the example embodiment, as the process for forming the sacrificial layer (not illustrated) in a coil bar state in which the pre-dicing is completed is not performed, the recess R and the filling portion 600 may not be included.

The sacrificial layer (not illustrated) may be formed by printing in a strip shape on a substrate in a coil state before being diced into individual chip components. Although not illustrated in detail, in the example embodiment, a strip may be printed to form a gap on a substrate in a coil bar state, which is spaced apart in a width direction Y. The sacrificial layer (not illustrated) may be only formed on one of the surfaces of the body 100, the sixth surface 106. Accordingly, a width of each of the external electrodes 410 and 420 formed on the sixth surface 106 of the body 100 may be less than a width of the body. After the sacrificial layer (not illustrated) is formed, the sacrificial layer (not illustrated) may be coated on the first surface 101 and the second surface 102 of the body 100 by stamping. A width of the stamped sacrificial layer (not illustrated) may be less than a width of the body 100. Accordingly, a width of each of the external electrodes 410 and 420 formed on the first surface 101 and the second surface 102 of the body 100 may be less than a width of the body 100.

Referring to FIG. 11, the first and second external electrodes 410 and 420 may be disposed on a portion of the second surface 102 of the body 100 and a portion of the first surface 101 and the sixth surface 106. For example, the first external electrode 410 may be formed on a portion of the second surface 102 of the body 100 and may extend to a portion of the sixth surface 106 of the body 100, and the second external electrode 420 may be formed on a portion of the first surface 101 of the body and may extend to a portion of the sixth surface 106 of the body 100. Accordingly, a width of each of the first and second external electrodes 410 and 420 may be less than a width of the body 100.

According to the aforementioned example embodiments, by the process of disposing the sacrificial layer on the region of the surface of the body in which the external electrodes are formed, the insulating layer may be collectively formed on the surface of the body.

Also, the phenomenon in which the insulating layer is not formed on an edge portion of the body may be reduced.

Also, by the process of peeling the sacrificial layer, adhesive force between the body and the external electrode may increase.

While the exemplary embodiments have been shown and described above, it will be apparent to those skilled in the art that modifications and variations could be made without departing from the scope of the present invention as defined by the appended claims.

What is claimed is:

1. A coil component, comprising:
a support substrate;
a coil portion disposed on at least one surface of the support substrate;
a body including the support substrate and the coil portion disposed therein;
an external electrode disposed on at least one surface of the body and connected to the coil portion; and
an insulating layer disposed in a region of the at least one surface of the body other than a region in which the external electrode is disposed,
wherein an average roughness (Ra) of the at least one surface of the body in contact with the external electrode is different from an average roughness (Ra) of the at least one surface of the body in contact with the insulating layer, and
wherein an average roughness (Ra) of a first area of a bottom surface of the body on which the external electrode is disposed is greater than an average roughness (Ra) of a second area of the bottom surface of the body on which the external electrode is not disposed.

2. The coil component of claim 1, wherein the average roughness (Ra) of the at least one surface of the body in contact with the external electrode is greater than the average roughness (Ra) of the at least one surface of the body in contact with the insulating layer.

3. The coil component of claim 2,
wherein the average roughness (Ra) of the at least one surface of the body in contact with the external electrode is 5 μm or greater and 50 μm or less.

4. The coil component of claim 1, wherein the external electrode includes first and second external electrodes disposed on the at least one surface of the body and spaced apart from each other.

5. The coil component of claim 4,
wherein the body has a first surface and a second surface opposing each other, a third surface and a fourth surface connecting the first surface to the second surface and opposing each other, and a fifth surface and a sixth surface connecting the first surface to the second surface and opposing each other,
wherein the coil portion includes a first lead-out pattern disposed on one surface of the support substrate and a second lead-out pattern disposed on the one surface of the support substrate and spaced apart from the first lead-out pattern, and
wherein the first and second external electrodes are connected to the first and second lead-out patterns, respectively.

6. The coil component of claim 1, wherein a width of the external electrode is less than a width of the body.

7. A coil component, comprising:
a support substrate;

a coil portion disposed on at least one surface of the support substrate;

a body including the support substrate and the coil portion disposed therein;

an external electrode disposed on at least one surface of the body and connected to the coil portion; and an insulating layer disposed in a region of the at least one surface of the body other than a region in which the external electrode is disposed, wherein an average roughness (Ra) of the at least one surface of the body in contact with the external electrode is different from an average roughness (Ra) of the at least one surface of the body in contact with the insulating layer, wherein the external electrode includes first and second external electrodes disposed on the at least one surface of the body and spaced apart from each other, wherein the body has a first surface and a second surface opposing each other, a third surface and a fourth surface connecting the first surface to the second surface and opposing each other, and a fifth surface and a sixth surface connecting the first surface to the second surface and opposing each other, wherein the coil portion includes a first lead-out pattern disposed on one surface of the support substrate and a second lead-out pattern disposed on one surface of the support substrate and spaced apart from the first lead-out pattern, wherein the first and second external electrodes are connected to the first and second lead-out patterns, respectively, wherein the first and second lead-out patterns are exposed to the second and first surfaces of the body, respectively, wherein the first and second external electrodes are disposed on the second and first surfaces of the body, respectively, and extending onto the sixth surface of the body and spaced apart from each other, and wherein an average roughness (Ra) of exposed surfaces of the first and second lead-out patterns in contact with the first and second external electrodes is less than an average roughness (Ra) of the second and first surfaces of the body in contact with the first and second external electrodes.

8. The coil component of claim 7, wherein an average roughness (Ra) of the exposed surfaces of the first and second lead-out patterns in contact with the first and second external electrodes is 1 μm or less.

9. The coil component of claim 7, wherein each of the first and second external electrodes further extends onto the fifth surface of the body.

10. The coil component of claim 5, further comprising:

a recess formed on each of edges of the sixth surface of the body and exposing portions of the first and second lead-out patterns to an outside of the body, wherein the first and second external electrodes each include a connection portion disposed on the recess and connected to a respective one of the first and second lead-out patterns, and an extension portion connected to the respective connection portion and extending along the sixth surface of the body.

11. The coil component of claim 10, further comprising:

a filling portion filling a portion of the recess and covering the respective connection portion.

12. A coil component, comprising:

a body including a first surface and a second surface opposing each other, a third surface and a fourth surface connecting the first surface to the second surface and opposing each other, and a fifth surface and a sixth surface connecting the first surface to the second surface and opposing each other;

a support substrate disposed in the body;

a coil portion disposed on at least one surface of the support substrate and including first and second lead-out patterns exposed to the second and first surfaces of the body, respectively;

first and second external electrodes disposed on the second and first surfaces of the body, respectively, and connected to the first and second lead-out patterns of the coil portion, respectively; and an insulating layer, formed as one integrated piece, disposed in a region of the at least one surface of the body other than a region in which the external electrode is disposed, wherein an average roughness (Ra) of exposed surfaces of the first and second lead-out patterns in contact with the first and second external electrodes is less than an average roughness (Ra) of the second and first surfaces of the body in contact with the first and second external electrodes.

13. The coil component of claim 12, wherein an average roughness (Ra) of the first or second surface of the body in contact with the first or second external electrode is different from an average roughness (Ra) of the first or second surface of the body in contact with the insulating layer.

14. The coil component of claim 13, wherein the average roughness (Ra) of the first or second surface of the body in contact with the external electrode is greater than the average roughness (Ra) of the first or second surface of the body in contact with the insulating layer.

15. The coil component of claim 14, wherein the average roughness (Ra) of the first or second surface of the body in contact with the external electrode is 5 μm or greater and 50 μm or less.

16. The coil component of claim 12, wherein the first and second external electrodes further extend onto the sixth surface of the body and spaced apart from each other.

17. The coil component of claim 12, wherein an average roughness (Ra) of exposed surfaces of the first and second lead-out patterns in contact with the first and second external electrodes is 1 μm or less.

18. The coil component of claim 12, wherein a width of the first or second external electrode is less than a width of the body.

19. The coil component of claim 12, wherein the coil portion includes first and second coil patterns disposed on first and second surfaces of the support substrate, respectively, and the first and second lead-out patterns disposed on the first surface of the support substrate.

20. The coil component of claim 19, wherein the coil portion further includes:

a third lead-out pattern disposed on the second surface of the support substrate, exposed to the second surface of the body, and connected to the second coil pattern; and a fourth lead-out pattern disposed on the second surface of the support substrate, exposed to the first surface of the body, and spaced apart from the third lead-out pattern, wherein the second lead-out pattern is connected to the first coil pattern.

21. The coil component of claim 20, wherein the first lead-out pattern is connected to the third lead-out pattern via a first connection via, and the second lead-out pattern is connected to the fourth lead-out pattern via a second connection via.

22. The coil component of claim 12, wherein the body includes cut-out portions on opposing edges of the sixth surface of the body adjacent to the first and second surfaces, such that each of the first and second lead-out patterns has a groove on one edge adjacent to a respective one of the opposing edges of the sixth surface.

* * * * *